United States Patent Office 3,655,789
Patented Apr. 11, 1972

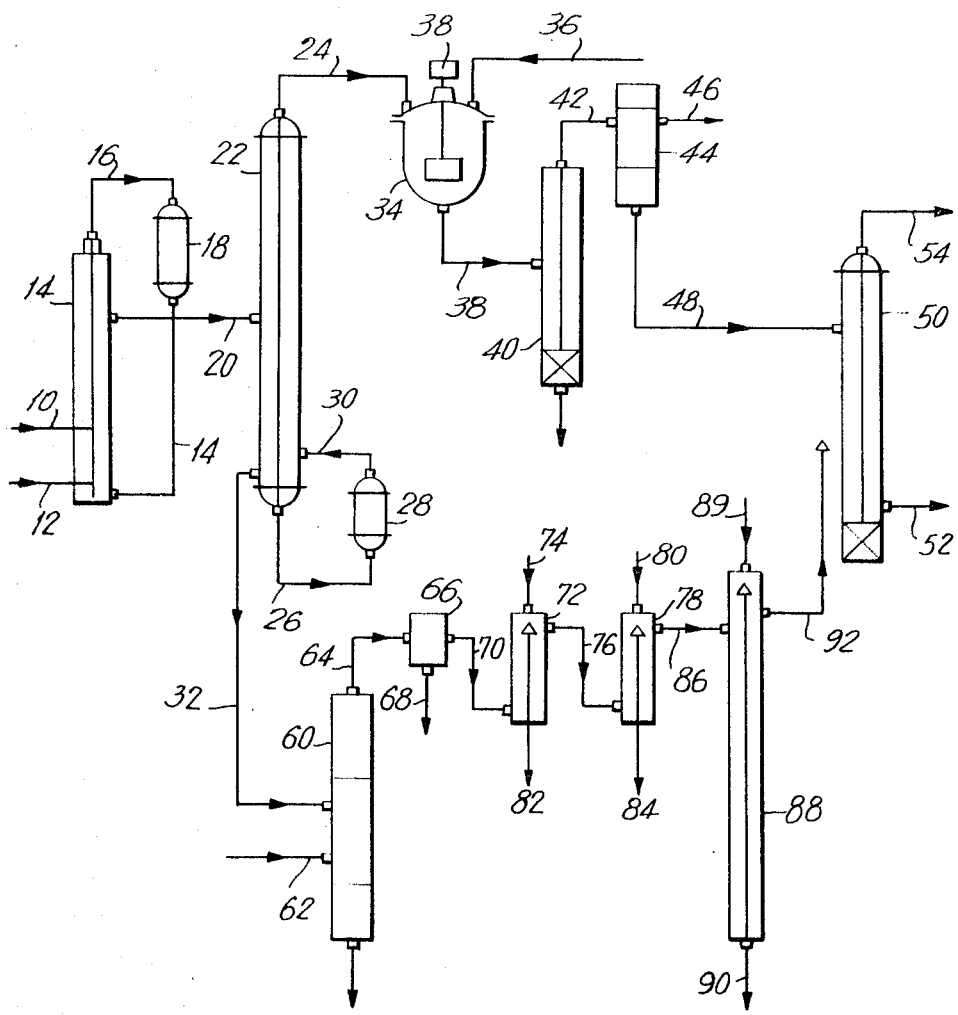

3,655,789
PROCESS FOR THE MANUFACTURE OF CARBON TETRACHLORIDE
Francisco Martinez-Alvarez, Ricardo Garcia Ruiz, Jaime Molinae de Porras, and Jose Luis Merina del Rio, Flix, Spain, and Walter Bertsch, Heimchen, Germany, assignors to Electro-Quimica de Flix S.A., Barcelona, Spain
Filed Sept. 4, 1968, Ser. No. 757,230
Claims priority, application Spain, Sept. 11, 1967, 344,937
Int. Cl. C07c *19/06*
U.S. Cl. 260—664                                  3 Claims

ABSTRACT OF THE DISCLOSURE

A process for the production of carbon tetrachloride by the synthesis of carbon disulfide and chlorine is shown. The reaction takes place in the liquid phase in a medium of reaction product at a temperature between 105° C. and 130° C. and the heat of reaction is removed by vapors generated in the reaction zone. Crude carbon tetrachloride is first distilled to remove sulfur monochloride by-product, then contacted with an aqueous alkaline solution to decompose sulfur chlorides and then subjected to two stages of distillation, to remove inorganic and organic impurities. Also shown is a process for recovering sulfur and hydrogen chloride from by-product sulfur monochloride. A vapor stream of sulfur monochloride is reduced at 350° to 500° C. with hydrogen. Crude hydrogen chloride vapor is first freed of residual sulfur monochloride and then absorbed in an aqueous medium. Sulfur is maintained at a temperature of 250° C. or more to prevent contamination with sulfur monochloride before removal to storage. In a preferred embodiment a vapor stream of sulfur monochloride from crude carbon tetrachloride distillation, is directly transferred to the reduction reactor.

---

This invention relates to a process for the manufacture of carbon tetrachloride by the reaction of chlorine and carbon disulfide. More specifically, it relates to a process for the efficient utilization of by-products produced in that reaction and the recovery of essentially all sulfur and chlorine values in the raw materials. Even more specifically, it relates to a process for the recovery and purification of carbon tetrachloride produced by the reaction of carbon disulfide and chlorine and the recovery of hydrogen chloride and sulfur from by-products of that reaction.

A number of processes are recognized for the production of carbon tetrachloride from carbon disulfide and chlorine according to the reaction:

$$CS_2 + 3Cl_2 \rightarrow CCl_4 + S_2Cl_2$$

The known processes differ by their use of sulfur monochloride, the by-product of the primary reaction, which has no significant industrial uses. In one conventional process the sulfur monochloride is reacted in a second stage with additional carbon disulfide to produce carbon tetrachloride and sulfur according to the reaction:

$$CS_2 + 2S_2Cl_2 \rightleftharpoons CCl_4 + 3S_2$$

This latter reaction is unsatisfactory for adaptation to commercial processes for the reason that a substantial reaction time must be permitted to insure that the reaction reaches equilibrium. Furthermore, the product of the reversible reaction contains both starting compounds and product compounds. Recovery of product from this mixture is complicated and expensive and a further chlorination of carbon disulfide is necessary to achieve satisfactory over-all yields. Still further, the purification of sulfur produced by the reaction is difficult due to its contamination with sulfur monochloride. The sulfur-sulfur monochloride system produces polysulfur chlorides which make purification of the sulfur practically impossible or at least uneconomic on an industrial scale. It has been suggested that these impurities be converted by reaction with alkalis. This, however, requires extraction and drying installations which are both expensive and complex.

Other reaction routes are known for recovery of values in the sulfur monochloride by-product of the primary reaction. Sulfur monochloride and hydrogen have been reacted in the presence of suitable catalysts to obtain sulfur and hydrogen chloride in accordance with the equation:

$$S_2Cl_2 + H_2 \rightarrow 2HCl + S_2$$

Still a further reaction is that of sulfur monochloride and hydrogen sulfide to obtain sulfur and hydrogen chloride according to the equation:

$$S_2Cl_2 + H_2S \rightarrow 2HCl + 3/2 S_2$$

In the chlorination of carbon disulfide, batchwise operation and small chlorinators have conventionally been used. A substantial heat of reaction, 68.7 Kcal. per mole of carbon tetrachloride, has made it necessary to install a number of controls in the chlorinators and feed streams thereto. The carbon tetrachloride product obtained in conventional processes usually contains 0.1% carbon disulfide as an impurity. The crude product must be purified to satisfy specifications imposed by manufacturers of fluorochlorinated hydrocarbon.

It is the primary object of this invention to produce carbon tetrachloride of high purity by the reaction of carbon disulfide and chlorine in an efficient and economic manner.

It is a further object of this invention to provide a process for the recovery of sulfur and chlorine values in the sulfur monochloride by-product of the primary reaction without incurring substantial processing costs.

It is still a further object of this invention to provide an integrated process for the production of carbon tetrachloride and the recovery of raw material values in the by-products.

These and other objects of this invention are accomplished in a process for the production of carbon tetrachloride as is shown in the accompanying drawing.

In the drawing:
FIG. 1 is a process flow sheet showing the sequence of unit operations in carbon tetrachloride synthesis and purification and in the reduceion by hydrogen of sulfur monochloride produced in the primary synthesis.

Carbon disulfide and chlorine are fed separately via lines 10 and 12 respectively to the lower portion of a continuous chlorinator 14. Chlorinator 14 is annular in configuration and may be provided with indirect heat transfer capacity to remove, if desired, a portion of the heat of reaction. The carbon disulfide and chlorine are fed into an inventory of carbon tetrachloride and sulfur monochloride which were theretofore formed and recirculated through the reactor as hereinafter described. The chlorinator is operated at the autogenous pressure of the reaction mixture at the desired reaction temperature. Preferably the reaction temperature is maintained at 105° to 130° C. In this range the product formed contains a minimum of unreacted carbon disulfide, about 0.03%, and purification problems downstream are thereby prevented. The considerable heat of reaction causes a portion of the reacting mixture to vaporize. These vapors are removed via line 16 from reaction zone 14 and condensed in condenser 18, which is a conventional shell and tube heat exchanger.

Condensate is recycled to the lower portion of reactor 14. The conversion of carbon disulfide under the conditions described may be as high as 200 kg./hr. per cubic meter of reactor volume.

A product stream of carbon tetrachloride and sulfur monochloride with traces of carbon disulfide and chlorine therein is withdrawn from the upper part of chlorinator 14 via line 20 and transferred to distillation zone 22. This is a conventional distillation tower with reflux and reboiling capacity. An overhead product of crude carbon tetrachloride containing additionally sulfur monochloride and traces of carbon disulfide and chlorine is removed via line 24. A bottoms stream comprising sulfur monochloride is removed via line 26, reboiled in reboiler 28 and returned in vapor form vial line 30 to distillation zone 22. A vapor stream of sulfur monochloride is removed from the lower part of distillation zone 22 via line 32 and is processed in accordance with the scheme described more fully below.

The overhead product of distillation zone 22 is introduced via line 24 to stirred vessel 34. An aqueous alkaline solution is introduced to stirred vessel 34 via line 36 and agitator 38 mounted in vessel 34 causes intimate contact of the crude carbon tetrachloride and aqueous solution. Sulfur monochloride and any sulfur disulfide which accompanies it are destroyed herein by contact with the alkaline solution. Crude carbon tetrachloride is then transferred via line 38 to second distillation zone 40. This is a conventional distillation column with reflux and reboil capacity which removes inorganic impurities from the carbon tetrachloride in a bottoms stream. The overhead product from second distillation zone 40 which includes carbon tetrachloride and water as well as traces of carbon disulfide is transferred via line 42 to decanter 44. The water and carbon tetrachloride are permitted to separate therein into an upper phase comprising water and a lower phase comprising carbon tetrachloride. The water is drawn off via line 46 and discarded. The carbon tetrachloride phase is drawn off from decanter 44 via line 48 and passes to third distillation zone 50, which is a conventional distillation column having refluxing and reboiling capacity. The crude carbon tetrachloride is rectified in column 50 and a purified carbon tetrachloride product is removed via line 52 from the lower part of the column. The overhead product from column 50 contains carbon tetrachloride and traces of carbon disulfide. The overhead product is removed via line 54 and may be recycled to reaction zone 14.

The vapor stream of sulfur monochloride which is removed from first distillation zone 22 via line 32 is passed to vapor phase reactor 60. Reactor 60 is a tubular reactor of quartz packed with Raschig rings. The sulfur monochloride vapor is contacted therein with a stream of hydrogen introduced via line 62 and is reduced to molten sulfur and hydrogen chloride vapor. The reaction zone is maintained at a temperature of 350° to 500° C. in order to bring about the stoichiometric reduction of sulfur monochloride. Hydrogen chloride vapor, including variable amounts of sulfur monochloride and traces of hydrogen sulfide, sulfur and occasionally hydrogen is removed from reaction zone 60 via line 64 and passes to condenser 66. It is cooled therein and sulfur monochloride in the crude hydrogen chloride vapor is condensed and removed from condenser 66 via line 68. This stream may be recycled in vapor form to reactor 60.

The crude hydrogen chloride vapor from which some sulfur monochloride has been removed passes via line 70 to first scrubbing column 72 wherein it is contacted with a spray of carbon tetrachloride introduced via line 74. The scrubbed gas then passes via line 76 to second scrubbing column 78 wherein it is contacted with a second spray of carbon tetrachloride introduced via line 80. Substantially all of the sulfur monochloride in the crude hydrogen chloride vapor is removed in the two scrubbing columns. Carbon tetrachloride containing sulfur monochloride is removed from columns 72 and 78 via lines 82 and 84 respectively. These streams may, if desired, be recycled to the carbon tetrachloride purification train.

Hydrogen chloride vapor, containing traces of hydrogen sulfide and hydrogen, passes via line 86 to absorption tower 88 wherein it is contacted with either water or a solution of hydrogen chloride and is absorbed therein. The absorption medium is introduced via line 89. A concentrated solution of hydrogen chloride in water is removed from absorption tower 88 via line 90. Unabsorbed gases including hydrogen and hydrogen disulfide are removed from the head of absorption tower 88 via line 92.

The following examples disclose a preferred process for the synthesis of carbon tetrachloride and the recovery of values in by-product sulfur monochloride.

EXAMPLE 1

Carbon disulfide and chlorine, at the rate of 310 kg./hr. and 910 kg./hr. are separately introduced into the chlorinator. The chlorinator contains a mixture of 18% by weight carbon tetrachloride, 81.9% sulfur monochloride, 0.08% sulfur dichloride and 0.02% carbon disulfide at a temperature of 118° C., the boiling point of the mixture. The vapors which form in the chlorinator are condensed and the condensate is returned to the lower part of the chlorinator. A product draw-off of 1,180 kg./hr., having the percentage composition indicated above, is distilled in the first distillation zone. The overhead product contains 660 kg./hr. of a mixture of 95% carbon tetrachloride, 4.83% sulfur monochloride, 0.14% sulfur dichloride and 0.03% carbon disulfide. This crude carbon tetrachloride stream is treated with milk of lime to decompose the sulfur monochloride and sulfur dichloride. A slight excess of milk of lime is used to assure that the pH does not drop below 8.0. The thoroughly contacted mixture of crude carbon tetrachloride and milk of lime, which then contains the inorganic reaction products of the sulfur chlorides and calcium hydroxide, is distilled in a second distillation zone. The inorganic impurities are removed in the bottoms stream and water, carbon tetrachloride and carbon disulfide are removed in the distillate. The distillate is permitted to separate into two layers, an upper aqueous layer and a lower organic layer. The upper aqueous layer is decanted and the carbon tetrachloride lower layer is then rectified in the third distillation column. The overhead from the third distillation column contains 15 kg./hr. of carbon tetrachloride having 1.3% carbon disulfide therein. This stream may be recycled to the chlorination reactor. The bottoms product from the third distillation column contains 615 kg./hr. of carbon tetrachloride containing between 0 and 5 p.p.m. carbon disulfide.

EXAMPLE 2

A stream of sulfur monochloride at the rate of 200 kg./hr. (120 liters) is reacted with 42 m.³/hr. of hydrogen at a temperature of 450° C. in a reaction zone having a volume of 1.3 m.³. The lower portion of the reaction chamber which does not include packing is maintained at 250° C. to prevent contamination of sulfur with sulfur monochloride. The molten sulfur is then collected and stored at 230° C. The crude hydrogen chloride vapor is removed from the reaction zone and cooled to condense sulfur monochloride therein; the sulfur monochloride may then be recycle. The product sulfur is 99.985% pure and the chloride content is only 0.002%.

What is claimed is:

1. In a process for the liquid phase production of carbon tetrachloride from chlorine and carbon disulfide in which sulfur monochloride is formed as a by-product, separated from said product carbon tetrachloride and further reacted to recover chlorine and sulfur values therein, the steps of: reacting said by-product sulfur monochloride in a vapor phase reaction zone with hydrogen at a temperature of 350° to 500° C. and forming thereby molten sulfur and a vapor comprising hydrogen chloride and traces of sulfur monochloride; removing said molten sulfur and vapor from said reaction zone; condensing sulfur monochloride from said vapor; contacting said vapor with a liquid stream of carbon tetrachloride to remove traces of sulfur monochloride therefrom; and absorbing said hydrogen chloride vapor in an aqueous medium.

2. The process of claim 1 wherein said molten sulfur after removal from said reaction zone is maintained at a temperature of at least 250° C. to prevent contamination with sulfur monochloride.

3. The process of claim 1 wherein sulfur monochloride condensed from the vapor product of said reaction is recycled to said reaction zone.

References Cited

UNITED STATES PATENTS

| | | | |
|---|---|---|---|
| 1,697,483 | 1/1929 | Vanarsdel et al. | 260—664 |
| 3,109,866 | 11/1963 | Saller et al. | 260—664 |

DANIEL D. HORWITZ, Primary Examiner

U.S. Cl. X.R.

23—205, 154, 224